United States Patent Office 3,312,456
Patented Apr. 4, 1967

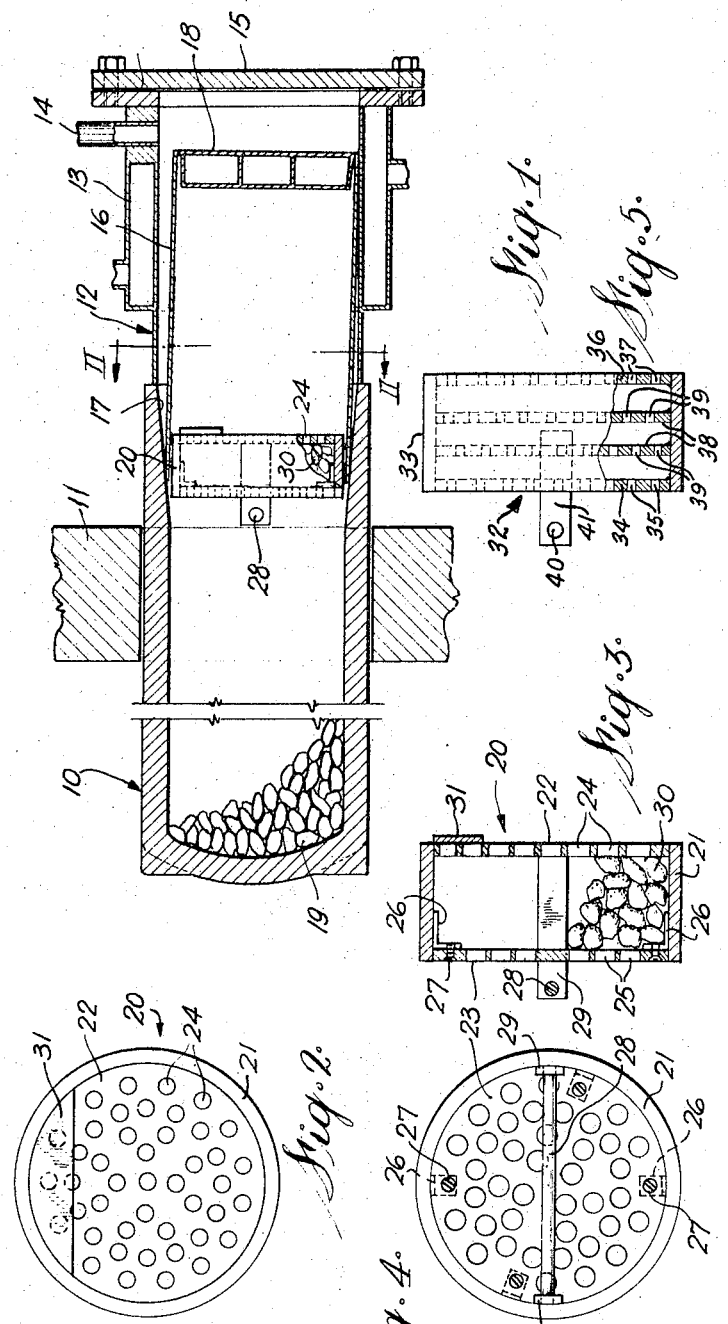

3,312,456
PURIFYING DEVICE FOR MAGNESIUM
PRODUCTION RETORT
Desmond M. Peplinski, Haley, Ontario, Canada, assignor to Dominion Magnesium Limited, Toronto, Ontario, Canada
Filed Nov. 25, 1964, Ser. No. 413,745
Claims priority, application Canada, Oct. 26, 1964, 914,871
7 Claims. (Cl. 266—19)

This invention relates to a purifying device for use in the production of magnesium.

Magnesium metal is usually produced by heating a charge of magnesia containing material with a reducing agent in a retort having a condenser section in which the magnesium containing vapors are condensed. It is, of course, highly desirable that the condensate consist of magnesium in as pure a form as possible. Generally speaking, the highest grade of magnesium condensate so produced complies with a 99.95% minimum purity grade.

It is an object of this invention to provide a purifier for magnesium production retorts which is of simple form, manufacture, and use and which results in the production of magnesium of a grade substantially improved with respect to regular 99.95% grade and which will meet a 99.98% grade.

In the conventional magnesium producing retort, a radiation shield is employed between the charge-containing section and the condenser section, the magnesium-containing vapors passing through such shield into the condenser.

In accordance with the invention, the radiation shield is replaced with a cylindrical housing having perforated end walls and filled with a packing comprising a composite body of material extending approximately throughout the cross-sectional area of said housing and having therein a multiplicity of communicating passages whereby the magnesium vapors must flow through such body to the condensing section.

The invention will be described with reference to the accompanying drawing, in which FIGURE 1 is a sectional side elevation of a retort embodying the device of the present invention, FIGURE 2 is a view of one end of the purifying device, FIGURE 3 is a sectional elevation of the purifying device, FIGURE 4 is a view of the other end of the device, and FIGURE 5 is a sectional elevation of a modified form of purifying device.

Referring to FIGURE 1, there is illustrated therein a typical magnesium production cylindrical retort comprising a charge-receiving or furnace section 10 arranged within a furnace, indicated by the wall 11, and a condenser section 12 outside the furnace. The condenser section is provided with a cooling water jacket 13, a vacuum connection 14, and a removable closure plate 15. A cylindrical sleeve 16 is freely seated in the condenser section. The "hot" end of the sleeve, that is, the end adjacent the furnace section, sits on a tapered interior end surface 17 of the furnace section. The other or "cool" end of the sleeve is provided with a baffle plate 18. The charge, which may be in the form of briquets 19, as shown, comprises a magnesia containing material and a reducing agent.

The furnace is normally operated at a temperature of 1100–1400° C. It will be understood that, following reduction of the charge by heating, the sleeve 16 containing the condensed magnesium is removed from the condenser section, and the magnesium "crown" in the sleeve removed therefrom.

In accordance with the invention, a purifying device 20 is removably seated in the hot end portion of the sleeve 16 during the reducing operation. The device, as shown in FIGURES 2, 3 and 4 comprises a cylindrical housing having an annular imperforate side wall 21, a circular end plate or wall 22, and a circular end plate or wall 23.

Wall 22 is provided with a multiplicity of perforations 24 substantially uniformly distributed throughout the wall. Wall 23 is also provided with a multiplicity of substantially uniformly distributed perforations 25. While the size of openings or perforations 24 and 25 may vary widely, each opening will generally not be less than ¼ inch or more than ¾ inch in diameter. Openings of the order of ⅜ inch to ½ inch in diameter are quite satisfactory.

Wall 22 is fixed, as by welding to one edge portion of wall 21. The other wall 23 is removably mounted on the other edge portion of wall 21 as by means of lugs 26 affixed to the inner surface of wall 21 and bolts 27. Wall 23 is provided with a handle 28 which comprises a rod having its ends mounted in brackets 29 fixed to edge portions of the wall.

The housing 20 is adapted to be filled with a body of refractory particles 30. The refractory employed must be capable of withstanding temperatures of the order of 1100° C. to 1500° C. The refractory may be of conventional manufacture having a fireclay, high-alumina, or silica base. A suitable refractory is an insulating fire brick such as that sold under the trade name "B & W K–26" or "B & W K–28" and manufactured by Babcock & Wilcox Company, or that sold under the trade name "H-W 26" or "H-W 28" and manufactured by Harbison-Walker Refractories Company. The refractory is crushed to a particle size of ¾ inch to 2 inches.

It will be understood that the outer diameter of housing 20 is such that it will have a sliding, snug fit within the end portion of sleeve 16. For example, if the internal diameter of the sleeve is about 9⅞ inches, a housing of about 9⅝ inches in external diameter is satisfactory. Thus, the housing diameter will generally be ⅛ to ½ inch less than the internal diameter of the sleeve.

FIGURE 1 illustrates the apparatus in operating order. As shown, the wall 23 of the purifier is disposed on the furnace or hot side of the apparatus and the wall 22 on the condenser or cool side thereof.

It will be apparent that the magnesium containing vapors arising in the furnace section must flow through the crushed refractory in the purifier into the condenser. In order to ensure that no portion of the vapor stream bypass the refractory body which may not completely fill the housing, a minor upper section of the wall 22 is provided with a dam or baffle 31.

It will be understood that substantially the maximum number of holes or perforations 24 and 25 in plates 22 and 23 are provided in order to permit a maximum degree of contact of the vapors with the refractory body. It will also be understood that the size of each hole 24 and 25 is the maximum possible consistent with retention of the refractory particles in the housing.

It has been found that the refractory body in the purifier 20 extracts impurities from the vapor stream to an extent that the magnesium condensed in the sleeve 16, on melting and refining in accordance with standard recognized practices, will produce a product complying with a 99.98% minimum purity.

The purifier 20 is readily mounted in and removed from the sleeve by means of the handle 28.

While dimensions of the purifying device will vary in accordance with the size of the retort with which it is employed, a housing 20 having an external diameter of 9⅝ inches, and an internal diameter of 9 1/16 inches, may have an axial extent of 2½ to 4 inches.

Referring to FIGURE 4, the device shown comprises a housing 32 having an annular imperforate wall 33, a circular end plate or wall 34 having perforations 35 therein, and a circular end plate or wall 36 having perforations 37 therein. Plates 34 and 36 may be welded in place. Within the housing are a pair of plates 38 in spaced parallel relation to each other and to plates 34 and 36. Each plate 38 has a diameter slightly less than the internal diameter of wall 33 and has its peripheral edge attached thereto as by welding. Each plate 38 is provided with a multiplicity of holes 39. The device is provided with a handle 40 which comprises a rod having its ends fixed to brackets 41 fixed to wall 33.

The following dimensions are given as an example of a satisfactory form of purifying device:

Wall 33: Inches
  Outside diameter _____ 9⅝
  Inside diameter _____ 9 1/16
  Axial extent _____ 3
Plate 34:
  Thickness _____ ¼
  Holes 35 _____ ½
Plates 36, 38:
  Thickness _____ 3/16
  Holes 37, 39 _____ ⅜

It is apparent that a build-up of impurities will occur on the body within the housing 20. In the case of the purifier of FIGURE 3, the refractory body is simply replaced with a fresh supply of refractory particles. This is accomplished by removing the plate 23, emptying the spent body from the housing, inserting a fresh supply, and replacing the plate 23. In the case of the purifier of FIGURE 5, the plates may be subjected to a sandblasting or pickling treatment to remove the build-up.

The following Table I shows the results of one month's magnesium production utilizing the purifier of FIGURE 3. The purifier was used in all the retorts of one furnace, i.e., the equipment employed was of standard type with the exception of the use of the purifier described.

TABLE I.—SPECIFICATION REQUIREMENTS FOR 99.95 AND 99.98% GRADES OF MAGNESIUM—COMPOSITION OF MAGNESIUM METAL PRODUCED WITH THE STANDARD CONDENSER EQUIPMENT

| Elements | Specification Requirements 99.95% Grade Magnesium Max. Impurities | One month's magnesium production with Standard Equip. | | Specification Requirements 99.98% Grade Magnesium Max. Impurities |
|---|---|---|---|---|
| | | Average | Range | |
| Al | .01 | .005 | .002–.01 | .004 |
| Zn | .01 | .005 | .003–.01 | .01 |
| Mn | .01 | .003 | .001–.009 | .001 |
| Fe | .003 | .002 | .001–.003 | .001 |
| Ni | .001 | <.001 | <.001 | .0005 |
| Cu | .002 | .001 | .001 | .0005 |
| Si | .010 | .003 | .001–.007 | .003 |
| Pb | .003 | <.001 | <.001 | .001 |
| Sn | .001 | <.001 | <.001 | .001 |
| Ca | | <.001 | <.001–.003 | .001 |

The following Table II gives the impurity analyses of a series of casts made with magnesium condensates produced with use of the purifier of the present invention.

TABLE II.—METAL CAST FROM MAGNESIUM CONDENSATES PRODUCED WITH USE OF THE PURIFIER OF PRESENT INVENTION

Metal analysis—percent

| Cast No. | | Al | Zn | Mn | Fe | Ni | Cu | Si | Pb | Sn | Ca |
|---|---|---|---|---|---|---|---|---|---|---|---|
| 168B2 | 1 | .0010 | .007 | –.0005 | .001 | –.0005 | –.0005 | .0025 | –.001 | –.001 | –.001 |
| B3 | 2 | .0010 | .004 | –.0005 | .001 | –.0005 | –.0005 | .003 | –.001 | –.001 | –.001 |
| 169B1 | 3 | .0014 | .007 | –.0005 | .001 | –.0005 | –.0005 | .0033 | –.001 | –.001 | –.001 |
| B2 | 4 | .0020 | .008 | –.0005 | .001 | –.0005 | –.0005 | .0025 | –.001 | –.001 | –.001 |
| B3 | 5 | .0016 | .007 | –.0005 | .001 | –.0005 | –.0005 | .0022 | –.001 | –.001 | –.001 |
| 185A1 | 6 | .002 | .01 | .001 | .001 | –.001 | –.0005 | .001 | –.001 | –.001 | –.001 |
| A2 | 7 | .001 | .009 | .0013 | .001 | –.001 | –.0005 | .0015 | –.001 | –.001 | –.001 |
| A3 | 8 | .003 | .007 | .0013 | .001 | –.001 | –.0005 | .003 | –.001 | –.001 | –.001 |
| 186A1 | 9 | .003 | .008 | .0015 | .001 | –.001 | –.0005 | .002 | –.001 | –.001 | –.001 |
| A2 | 10 | .0014 | .009 | .0003 | .001 | –.001 | –.0005 | .002 | –.001 | –.001 | –.001 |
| A3 | 11 | .003 | .006 | .0010 | .001 | –.001 | –.0005 | .001 | –.001 | –.001 | –.001 |
| A4 | 12 | .0016 | .007 | .0003 | .001 | –.001 | –.0005 | .002 | –.001 | –.001 | –.001 |
| A5 | 13 | .002 | .007 | .0010 | .001 | –.001 | –.0005 | .003 | –.001 | –.001 | –.001 |
| 187A1 | 14 | .002 | .006 | .0014 | .001 | –.001 | –.0005 | .003 | –.001 | –.001 | –.001 |
| A2 | 15 | .0032 | .008 | .0006 | .001 | –.001 | –.0005 | .002 | –.001 | –.001 | –.001 |
| A3 | 16 | .004 | .007 | .0012 | .001 | –.001 | –.0005 | .001 | –.001 | –.001 | –.001 |
| A4 | 17 | .0022 | .008 | .0005 | .001 | –.001 | –.0005 | .001 | –.001 | –.001 | –.001 |
| A5 | 18 | .002 | .007 | .0012 | .001 | –.001 | –.0005 | .002 | –.001 | –.001 | –.001 |
| A6 | 19 | .002 | .004 | .0010 | .001 | –.001 | –.0005 | .001 | –.001 | –.001 | –.001 |
| 188A1 | 20 | .0016 | .006 | .0006 | .001 | –.001 | –.0005 | .0034 | –.001 | –.001 | –.001 |
| A2 | 21 | .0010 | .01 | .0005 | .0015 | –.001 | –.0005 | .0020 | –.001 | –.001 | –.001 |
| A3 | 22 | .001 | .008 | .0005 | .0012 | –.001 | –.0005 | .0032 | –.001 | –.001 | –.001 |
| A4 | 23 | .002 | .01 | .0013 | .0010 | –.001 | –.0005 | .003 | –.001 | –.001 | –.001 |

Experiments have shown that the device of FIGURE 5 is at least as effective as the device of FIGURE 3.

I claim:

1. The combination with a magnesium producing retort having a furnace section, a condenser section, and a condenser sleeve removably seated in said condenser section, said sleeve having an end portion in adjacent relation to said furnace section, of a purifying device comprising a cylindrical housing seated in said end portion of said sleeve and having a snug sliding fit in said sleeve, said housing having perforated end walls, and a composite body of material in said housing having therein a multiplicity of passages communicating with each other and with said perforated end walls, said body comprising refractory particles having a size ranging from ¾ inch to 2 inches and being capable of withstanding temperatures in excess of 1200° C.

2. The combination defined in claim 1, one of said end walls being removably mounted for access to the interior of said housing and having a handle thereon.

3. The combination defined in claim 1, one of said end walls being removably mounted for access to the interior of said housing, the other of said end walls having an imperforate section adjoining one edge portion thereof.

4. The combination with a magnesium producing retort having a furnace section, a condenser section, and a condenser sleeve removably seated in said condenser section, said sleeve having an end portion in adjacent relation to said furnace section, of a purifying device comprising a cylindrical housing seated in said end portion of said sleeve, said housing having perforated end walls, and a composite body of material in said housing having therein a multiplicity of passages communicating with each other and with said perforated end walls, said housing having an external diameter of one-eighth to one-half inch less than the internal diameter of said sleeve, said body comprising refractory particles having a size ranging from ¾ inch to 2 inches and being capable of withstanding temperatures in excess of 1200° C.

5. The combination with a magnesium producing retort having a furnace section, and a condenser section, having an end portion in adjacent relation to said furnace section, of a purifying device comprising a structure having a pair of spaced perforated walls seated in said end portion of said condenser section, each said wall extending substantially throughout the cross-sectional area of said condenser section whereby all vapors arising in said furnace section must pass through the perforations in said walls to reach said condenser section, said walls providing a purifying chamber therebetween, and a body of particles of refractory material substantially filling said chamber, said body having a multiplicity of communicating passages between said particles to provide a circuitous path for vapor entering said chamber through one said perforated wall and leaving said chamber through the other of said perforated walls.

6. The combination with a magnesium producing retort having a furnace section, and a condenser section, having an end portion in adjacent relation to said furnace section, of a purifying device comprising a structure having a pair of spaced perforated walls seated in said end portion of said condenser section, each said wall extending substantially throughout the cross-sectional area of said condenser section whereby all vapors arising in said furnace section must pass through the perforations in said walls to reach said condenser section, said walls providing a purifying chamber therebetween, and at least one perforated plate fixed within said chamber in spaced, substantially parallel relation to said walls, said plate extending substantially throughout the cross-sectional area of said chamber and providing a multiplicity of passages for vapors entering said chamber through one said perforated wall and leaving said chamber through the other of said perforated walls.

7. A metal vapor purifying device as defined in claim 6, including a plurality of said plates fixed within said chamber, all of said plates being in spaced, substantially parallel relation to each other.

References Cited by the Examiner

UNITED STATES PATENTS 3,017,263  1/1962  Bretschneider et al. ___75—66 X
3,207,495  9/1965  Gibbs _____ 266—19

JOHN F. CAMPBELL, *Primary Examiner.*

R. F. DROPKIN, *Assistant Examiner.*